United States Patent [19]
Reichert et al.

[11] Patent Number: 5,378,801
[45] Date of Patent: Jan. 3, 1995

[54] CONTINUOUS PROCESS FOR THE PREPARATION OF RESORABLE POLYESTERS AND THE USE THEREOF

[76] Inventors: Dieter Reichert, Albrecht-Durer-Str. 17, D-6507 Ingelheim am Rhein, Germany; Franz D. Klingler, Sattlerweg 3, D-6500 Mainz-Bretzenheim, Germany; Horst Schwall, Im Herzenacker 37, D-6535 Gau-Algesheim, Germany; Albert Christmann, In der Dorrwiese 33, D-6507 Ingelheim am Rhein, Germany; Berthold Buchholz, Grundstr. 55, D-6507 Ingelheim am Rhein, Germany

[21] Appl. No.: 101,163

[22] Filed: Aug. 3, 1993

Related U.S. Application Data

[63] Continuation of Ser. No. 536,602, Aug. 22, 1990, abandoned.

[30] Foreign Application Priority Data

Nov. 1, 1988 [DE] Germany ............... 3837084

[51] Int. Cl.$^6$ .................. C08G 63/08; C08F 6/00
[52] U.S. Cl. .................... 528/354; 528/357; 528/361; 528/480; 528/481
[58] Field of Search ............. 528/480, 481, 354, 357, 528/361; 526/73

[56] References Cited

U.S. PATENT DOCUMENTS 4,990,222  2/1991  Aigner et al. ............... 203/91

*Primary Examiner*—John Kight, III
*Assistant Examiner*—Shelley A. Dodson
*Attorney, Agent, or Firm*—D. E. Frankhouser; A. R. Stempel; M-E. M. Timbers

[57] ABSTRACT

The invention relates to a continuous process for the preparation of resorbable polyesters.

11 Claims, No Drawings

CONTINUOUS PROCESS FOR THE PREPARATION OF RESORABLE POLYESTERS AND THE USE THEREOF

This is a continuation of application Ser. No. 07/536,602, filed Aug. 22, 1990 abandoned.

This invention relates to a continuous process for the preparation of resorbable polyesters and the use thereof.

Resorbable polyesters, especially those on the basis of cyclic esters of hydroxy-carboxylic acids, are being used increasingly in the field of surgical materials, e.g. suture material, clips, clamps, devices for osteosynthesis, as supports for galenic preparations in the form of enteral and parenteral active substance supports.

Processes for the preparation of polymers of this kind are known in the art in numerous variations, many different properties being obtained for the polymers depending on the composition of the monomers and the polymerisation conditions.

Resorbable polyesters were hitherto prepared in relatively small quantities by the process known as batch operation. One essential disadvantage of this manufacturing process is the fact that during batch operation the temperature cannot be controlled with sufficient accuracy owing to the exothermic nature of the reaction and owing to the high viscosity of the reaction mixture, which can only be stirred with difficulty. In addition, the discharge of the polymer melt from the reaction vessel poses considerable problems. The preparation of crystalline polymers by batch operation causes particular difficulty owing to the transition from the liquid to the solid phase occurring in this connection. One further disadvantage of batch operation is that of the long reaction times, which can be up to 48 hours or more.

The object of this invention is to provide a polymerisation process for the preparation of resorbable polyesters, by means of which it is possible to prepare both amorphous and crystalline polymers and to achieve good temperature control during polymerisation.

This problem is solved according to the invention by continuous polymerisation of the monomers used under controlled temperature conditions.

The process according to the invention is characterised in that polymerisation is effected in an extruder, preferably a twin-screw extruder having temperature segments that can be adjusted independently of one another, and with controlled charge.

Extruders, as well as twin-screw extruders, as used for the process according to the invention, are known in principle and are generally used in the plastics-processing industries for the homogenisation of plastic granules, if appropriate, adding auxiliary agents, such as fillers or colouring agents, for the production of the necessary preliminary pressure at the shaping tool.

According to the invention, a twin-screw extruder is used as the polymerisation reactor.

The reactor includes a storage vessel, in which the monomers or monomer blends, the polymerisation catalyst and any auxiliary agents are placed as a homogeneous mixture. The monomers are advantageously in the form of granulated material or powder. The reactants are charged to the extruder via a conveyor system. The first temperature segment of the reactor advantageously comprises a cooling device, in order to prevent premature, unintended, melting of the reaction mixture, or premature, uncontrolled, polymerisation.

The temperatures of the subsequent heating segments are set so that the reaction mixture melts safely and homogeneously and polymerisation occurs. A homogeneous distribution of temperature over the entire cross section of the reactor is achieved by virtue of the controlled charge and controlled mixing in the extruder.

In another embodiment of the process, the monomer or a monomer blend is supplied in the form of a melt from a storage vessel of the extruder, which can be heated if desired.

The rotational speed of the extruder is variable within specific limits and so the dwell time of the reaction mixture can be adjusted in this manner. It is therefore possible to control the conversion and the degree of polymerisation over a wide range depending on the set temperature pattern.

The number of temperature segments is not critical, as long as the temperatures can be set at the desired values along the length of the extruder. The temperature at the outlet should be set so that the polymer is still mouldable and a shaping tool can be connected if desired. The twin-screw extruder used according to the invention comprises devices by means of which it is possible to carry out polymerisation in the absence of water and moisture, e.g. devices for producing and maintaining an inert atmosphere, e.g. consisting of nitrogen or argon.

The reactor can be charged with pure monomers or blends of different monomers, in order to obtain homopolymers or copolymers. However, it can also be charged with blends consisting of prepolymers and monomers. In this embodiment of the process, block polymers or graft polymers are obtained, depending on the structure of the prepolymer.

In a further embodiment, the twin-screw extruder comprises an additional device used for the input of auxiliary agents, e.g. colouring agents, softeners, pharmaceuticals, contrast media, etc.

Monomers are generally introduced into the storage vessel. In order to prepare specific copolymers, it is also possible to place a polymer mixed with one or more monomers in the storage vessel and to convert this into a copolymer.

Although the process according to the invention is not limited to the preparation of specific resorbable polymers, the following polymers and copolymers are preferably prepared:

poly (L-lactide)
poly ( D-L-lactide)
poly (meso-lactide)
poly (glycolide)
poly (trimethylene carbonate)
poly (epsilon-caprolactone)

poly(L-lactide-co-D,L-lactide)
poly(L-lactide-co-meso-lactide)
poly(L-lactide-co-glycolide)
poly(L-lactide-co-trimethylene carbonate)
poly(L-lactide-co-epsilon-caprolactone)

poly(D,L-lactide-co-meso-lactide)
poly(D,L-lactide-co-glycolide)
poly(D,L-lactide-co-trimethylene carbonate)
poly(D,L-lactide-co-epsilon-caprolactone)

poly(meso-lactide-co-glycolide)
poly(meso-lactide-co-trimethylene carbonate)

poly(meso-lactide-co-epsilon-caprolactone)

poly(glycolide-co-trimethylene carbonate)
poly(glycolide-co-epsilon-caprolactone)

Suitable polymerisation catalysts are known in the art, stannous octoate and tin salts (e.g. $SNCl_2 \times 2H_2O$) being preferred.

In particular, the following homopolymers and copolymers are preferably prepared by the process according to the invention.

1) Poly(L-lactides) having inherent viscosities of between 1 and 10, preferably poly(L-lactides) having inherent viscosities of between 1 and 4. Particularly suitable polylactides having inherent viscosities of between 2.0 and 3.5 are particularly preferred for the subsequent injection moulding.

2) Poly(D,L-lactides) having inherent viscosities of between 0.1 and 4.0. Poly(D,L-lactides) having inherent viscosities of between 0.5 and 2.0 are particularly preferred.

3) Poly(meso-lactides) having inherent viscosities of between 0.1 and 4.0.

4) Poly(glycolides) having inherent viscosities of between 1.0 and 1.6, preferably between 1.1 and 1.3. In this case, the process variables are preferably adjusted so that amorphous polyglycolides are produced.

5) Poly(L-lactide-co-D,L-lactides) and poly(L-lactide-co-meso-lactides) having monomer ratios of between 99:1 and 1:99, preferably monomer ratios of between 99:1 and 50:50. Ratios of between 99:1 and 96:4 or 95:5 and 70:30 are particularly preferred here.

6) Poly(L-lactide-co-glycolides) having monomer ratios of between 99:1 and 1:99, preferably monomer ratios of between 99:1 and 50:50 and between 20:80 and 1:99. Ratios of between 95:5 and 70:30 and between 15:85 and 5:95 are particularly preferred here.

7) Poly(D,L-lactide-co-glycolides) having monomer ratios of between 99:1 and 1:99. Monomer ratios of between 99:1 and 45:55 are preferred, particularly ratios of between 90:10 and 49:51. These polymers preferably have inherent viscosities of between 0.1 and 2.0, particularly between 0.3 and 1.5.

8) Poly(glycolide-co-trimethylene carbonate) having monomer ratios of between 99:1 and 1:99. The range between 99:1 and 50:50 is preferred, particularly the range between 90:10 and 60:40. The inherent viscosities of the polymers are preferably in the range between 0.5 and 3.0, particularly between 1.0 and 2.0.

9) Further polymers that can be prepared advantageously by the claimed process are, e.g.

poly(trimethylene carbonate)
poly(L-lactide-co-trimethylene carbonate)
poly(D,L-lactide-co-meso-lactide),
poly(D,L-lactide-co-trimethylene carbonate)
poly(meso-lactide-co-glycolide)
poly(meso-lactide-co-trimethylene carbonate)

Process variables to be adjusted according to the invention so that the polymers produced have the desired properties with respect to inherent viscosity, crystallinity, solubility or composition are: mixing ratios of the monomers, catalyst concentration, dwell time (screw speed, extruder length), temperature in the individual zones, cooling speed.

The inherent viscosity can be controlled, e.g. by the catalyst concentration. The inherent viscosity is reduced by the addition of chain-breaking reagents, e.g. water. This addition is advantageously effected in the form of the appropriate hydroxy-carboxylic acids having a defined water content, e.g. in the form of lactic acid or glycolic acid containing 10% of water. The chain length can be controlled within specific limits by the temperature of the heating segments. Lower temperatures result in longer polymer chains and higher temperatures in shorter polymer chains.

The inherent viscosity is given in dl/g at a concentration of 1 mg/ml in hexafluoroacetone sesquihydrate or hexafluoroacetone (polyglycolide and glycolide copolymers having >50% glycolide) or in chloroform (all other polymers) at 25° C. The mixing ratios of the copolymers are given in mole % (unless stated otherwise).

The advantage of the process according to the invention is accurate temperature control, by which means secondary reactions, e.g. undesired ester interchanges, are prevented. Surprisingly, amorphous, partially crystalline and highly crystalline polymers can be prepared in one type of reactor (extruder) by the process according to the invention, even when the reactivity of the monomers used lies over a wide range, e.g. as is the case with glycolide and lactide.

The extruder used for polymerisation comprises individual segments that can be set at different temperatures. The temperatures of these segments can be regulated, e.g. so that there is a cooling zone adjacent to the actual polymerisation zone. In contrast to batch operation, in the process according to the invention, the polymer can be cooled relatively quickly by virtue of the relatively small quantity of substance in the extruder and also the short dwell time. The crystalline properties of the polymer can be influenced in this manner, i.e. either amorphous or crystalline polymers can be obtained, depending on the duration and temperature of the cooling phase. By virtue of this rapid cooling, the polymers obtained display low crystallinity.

Surprisingly, it has been proven that it is possible to polymerise glycolide in the process according to the invention so that it can be used as a surgical suture material. Glycolide can be prepared according to the instructions of DE- A-36 36 187 and DE-A-36 36 188 hereby cited. In contrast to the polyglycolide prepared by batch operation, the polyglycolide prepared by the process according to the invention is characterised in that it is soluble in HFIP (hexafluoroisopropanol) and, depending on the reaction conditions, displays an inherent viscosity of between 1.1 and 1.7 dl/g.

Higher and lower viscosities can also be obtained by making appropriate additions.

The invention further relates to the use of the homopolymers and copolymers prepared by continuous polymerisation for the manufacture of surgical articles, e.g. suture material and devices for osteosynthesis, and pharmaceutical active substance supports. Several products for medicinal use which can advantageously be manufactured from catalyst-free polymers prepared by the process according to the invention are listed hereinafter by way of representative examples.

1. Solid products, compression moulded or machined:

Orthopaedic pegs, clamps, screws and plates,
Clips (e.g. for vena cava),
Staples,
Hooks, buttons and snap catches,
Bone substitute (e.g. dental prosthesis), Needles,
Non-permanent intrauterine devices (spermicidal),
Temporary drain tubes or test tubes or capillary tubes,
Surgical instruments,
Vascular implants or supporting media,
Vertebral discs,
Extracorporeal tubes for artificial kidneys and heart-lung machines.
Slowly decomposable ion-exchange resin,
slowly decomposable drug delivery products (pills, pellets),
reinforced bone pegs, needles, etc.
Implantable pellets filled with pharmaceutical preparations,
pins, films and other moulded articles for controlled drug delivery.

2. Fibrous products, knitted or woven, including velour

Burn dressings,
Trusses,
Absorbent paper or swabs,
Medical dressings,
Facial surgery,
Gauze, woven material, cloth, felt or sponge for haemostasis,
Gauze bandages,
Dental packings,
Suture material, finally ligatures.

Artery graft or arterial substitute
Bandages for cutaneous surfaces
Burn dressings (combined with other polymer films).

3. Pulverulent products, prepared by spray drying, grinding, precipitation or microencapsulation.

Injectable or implantable powder charged with pharmaceutical preparations for controlled and retarded drug delivery.

Microporous moulded articles, films, powders or granulated material to be charged with active substances.

4. Miscellaneous

Flakes or powders for burns or abrasion,
Foam material as an absorbent prosthesis,
Substitute for wire in splinting,
Film spray for prosthetic elements and for the dressing of wounds.

EXAMPLE 1

Continuous preparation of poly(glycolide)

0.1 g of $SNCl_2 \times 2H_2O$ and 2.2 g of 1-dodecanol were dissolved in 50 ml of dichloromethane in a suitable vessel and mixed with 1 kg of glycolide under low vacuum so that uniform distribution of the catalyst was achieved. This mixture was transferred to a hopper in the presence of an inert gas and was fed continuously from there via a shaking trough and in an inert atmosphere to the inlet part of a twin-screw extruder (Rheomex TW 100, Haake-Buchler) having three heating zones, a heatable horizontal circular extrusion die and a circular die inlet of 1.6 mm in diameter.

The extruder had the following temperature settings:

| inlet | zone 1 | zone 2 | zone 3 | extr. die |
|---|---|---|---|---|
| cold-water cooling | 190° C. | 230° C. | 220° C. | 200° C. |

The rotational speed of the extruder was set at 15 revolutions per minute and polymerisation was continuous at a rate of 320 g/hour. The resulting poly(glycolide) had an inherent viscosity of 1.1 dl/g, measured at a concentration of 0.1 g/dl in HFIP at 30° C.

EXAMPLE 2

Continuous preparation of poly(glycolide)

5 kg of glycolide was placed in a 10 l round-bottomed flask and a solution of 11.0 g of 1-dodecanol, 1.0 g of $SNCl_2 \times 2H_2O$ and 250 ml of dichloromethane was added in portions. The catalyst was distributed in a uniform manner under rotation and a low vacuum. This mixture was transferred to a hopper in the presence of an inert gas and was fed continuously from there via a shaking trough and in an inert atmosphere to the inlet part of a twin-screw extruder having three heating zones, a heatable horizontal circular extrusion die and a circular die inlet of 1.6 mm in diameter.

The extruder had the following temperature settings:

| inlet | zone 1 | zone 2 | zone 3 | extr. die |
|---|---|---|---|---|
| cold-water cooling | 190° C. | 230° C. | 220° C. | 200° C. |

The rotational speed of the extruder was maintained at 25 revolutions per minute for the first two minutes, reduced to 5 revolutions per minute for three minutes and then maintained at 25 revolutions per minute for the entire polymerisation time by means of programmable control. The rate of flow in this preparation was 1200 g/hour and the yield was 4.35 kg (87% of the charge).

The resulting poly(glycolide) had an inherent viscosity of 1.2 dl/g, measured at a concentration of 0.1 g/dl in HFIP at 30° C. The proportion extractable with ethyl acetate was less than 1%.

EXAMPLE 3

Continuous preparation of poly(L-lactide)

As described in Example 2, 1 kg of L-lactide and 0.6 g of octoate (tin(II)-di-2-ethyl hexanoate) were mixed homogeneously.

This mixture was transferred to a hopper in the presence of an inert gas and was fed continuously from there via a shaking trough and in an inert atmosphere to the inlet part of a twin- screw extruder having three heating zones, a heatable horizontal circular extrusion die and a circular die inlet of 1.6 mm in diameter.

The extruder had the following temperature settings:

| inlet | zone 1 | zone 2 | zone 3 | extr. die |
|---|---|---|---|---|
| cold-water cooling | 70° C. | 180° C. | 180° C. | 180° C. |

The rotational speed of the extruder was maintained at 25 revolutions per minute for the first two minutes, reduced to 5 revolutions per minute for fifteen minutes and then maintained at 25 revolutions per minute for the entire polymerisation time by means of programmable control.

The rate of flow in this preparation was 120 g/hour and conversion was approximately 70%.

The resulting poly(L-lactide) had an inherent viscosity of 1.0 dl/g, measured at a concentration of 0.1 g/dl in chloroform at 25° C.

EXAMPLE 4

Continuous preparation of poly(D,L-lactide)

As described in Example 2, 1 kg of D,L-lactide and 0.6 g of octoate (tin(II)-di-2-ethyl hexanoate) were mixed homogeneously.

This mixture was transferred to a hopper in the presence of an inert gas and was fed continuously from there via a shaking trough and in an inert atmosphere to the inlet part of a twin- screw extruder having three heating zones, a heatable horizontal circular extrusion die and a circular die inlet of 1.6 mm in diameter.

The extruder had the following temperature settings:

| inlet | zone 1 | zone 2 | zone 3 | extr. die |
| --- | --- | --- | --- | --- |
| cold-water cooling | 200° C. | 200° C. | 200° C. | 180° C. |

The rotational speed of the extruder was maintained at 25 revolutions per minute for the first two minutes, reduced to 5 revolutions per minute for three minutes and then maintained at 25 revolutions per minute for the entire polymerisation time by means of programmable control.

The rate of flow in this preparation was 400 g/hour and conversion was approximately 86%.

The resulting poly(D,L-lactide) had an inherent viscosity of 1.2 dl/g, measured at a concentration of 0.1 g/dl in chloroform at 25° C.

EXAMPLE 5

Continuous preparation of poly(D,L-lactide-co-glycolide) 50:50 mole %

348.5 g of glycolide and 432.5 g of D,L-lactide were mixed homogeneously in a ball mill in the presence of an inert gas. Then, as described in Example 2, 0.467 g of octoate (tin(II)- di-2-ethyl hexanoate) was distributed homogeneously. This mixture was fed continuously via a shaking trough and in an inert atmosphere to the inlet part of a twin-screw extruder having three heating zones, a heatable horizontal circular extrusion die and a circular die inlet of 1.6 mm in diameter.

The extruder had the following temperature settings:

| inlet | zone 1 | zone 2 | zone 3 | extr. die |
| --- | --- | --- | --- | --- |
| cold-water cooling | 70° C. | 200° C. | 200° C. | 180° C. |

The rotational speed of the extruder was maintained at 25 revolutions per minute for the first two minutes, reduced to 5 revolutions per minute for five minutes and then maintained at 25 revolutions per minute for the entire polymerisation time by means of programmable control.

The conversion in this preparation was approximately 72%.

The resulting poly(D,L-lactide-co-glycolide) (50:50 mole % had an inherent viscosity of 0.8 dl/g, measured at a concentration of 0.1 g/dl in chloroform at 25° C.

EXAMPLE 6

Continuous preparation of poly(glycolide-co-trimethylene carbonate)

0.08 g of $SNCl_2 \times 2H_2O$ and 1.16 g of diethylene glycol were dissolved in 50 ml of dichloromethane in a suitable vessel and mixed with 364 g of glycolide under vacuum so that uniform distribution of the catalyst was achieved. 156 g of trimethylene carbonate was then added and the mixture was melted in a water bath at 60°–65° C. The mixture had a catalyst content of 80 ppm of tin. The melt was fed in the presence of an inert gas to a heatable hopper fixed to the inlet part of a twin-screw extruder (Rheomex TW 100, Haake-Buchler) having three heating zones, a heatable horizontal circular extrusion die and a circular die inlet of 1.6 mm in diameter.

The extruder had the following temperature settings:

| hopper | zone 1 | zone 2 | zone 3 | extr. die |
| --- | --- | --- | --- | --- |
| 70° C. | 210° C. | 210° C. | 210° C. | 160° C. |

The rotational speed of the extruder was set at 3 revolutions per minute and polymerisation was effected continuously at a rate of approximately 90 g/hour. The resulting poly(glycolide-co-trimethylene carbonate) consisted of 28% of trimethylene carbonate units and 72% of glycolide units (percentages by weight) and had an inherent viscosity of 0.7 dl/g, measured at a concentration of 0.1 g/100 ml in HFIP at 30° C.

EXAMPLES 7–9

Example 6 was repeated with modified test conditions:

| Monomer ratio (parts by weight) | Catalyst (ppm Sn) | Temperatures Hopper zones 1–3 | | | Inherent viscosity (dl/g) |
| --- | --- | --- | --- | --- | --- |
| | | (°C.) | (°C.) | (°C.) | |
| 24:76 | 80 | 80 | 210 | 160 | 0.8 |
| 24:76 | 30 | 85 | 180 | 160 | 1.1 |
| 30:70 | 30 | 85 | 180 | 160 | 0.65 |

We claim:

1. Process for the preparation of resorbable polyesters, characterised in that the polymerisation process is carried out continuously in an extruder provided with heating segments the temperature of which can be regulated, the extruder having controlled charge.

2. Process according to claim 1, characterised by a polyester selected from the group:

poly(L-lactide), poly(D-L-lactide)
poly(meso-lactide), poly(glycolide)
poly(trimethylene carbonate)
poly(epsilon-caprolactone)

poly(L-lactide-co-D,L-lactide)
poly(L-lactide-co-meso-lactide)
poly(L-lactide-co-glycolide)

poly(L-lactide-co-trimethylene carbonate)
poly(L-lactide-co-epsilon-caprolactone)

poly(D,L-lactide-co-meso-lactide)
poly(D,L-lactide-co-glycolide)
poly(D,L-lactide-co-trimethylene carbonate)
poly(D,L-lactide-co-epsilon-caprolactone)

poly(meso-lactide-co-glycolide)
poly(meso-lactide-co-trimethylene carbonate)
poly(meso-lactide-co-epsilon-caprolactone)

poly(glycolide-co-trimethylene carbonate)
poly(glycolide-co-epsilon-caprolactone)

3. Process according to claim 1, characterised by a polyester selected from the group:

poly(L-lactides) having inherent viscosities of between 1 and 10,
poly(D,L-lactides) having inherent viscosities of between 0.1 and 4.0,
poly(meso-lactides) having inherent viscosities of between 0.1 and 4.0,
poly(glycolides) having inherent viscosities of between 1.0 and 1.6,
poly(L-lactide-co-D,L-lactides) and poly(L-lactide-co-meso-lactides) having monomer ratios of between 99:1 and 1:99, preferably monomer ratios of between 99:1 and 50:50,
poly(L-lactide-co-glycolides) having monomer ratios of between 99:1 and 50:50 and between 20:80 and 1:99,
poly(D,L-lactide-co-glycolides) having monomer ratios of between 99:1 and 45:55, and inherent viscosities of between 0.1 and 2.0,
poly(glycolide-co-trimethylene carbonate) having monomer ratios of between 99:1 and 50:50, and having inherent viscosities in the range between 0.5 and 3.0.

4. Process according to one of claims 1 to 3, characterised in that cyclic dimers of alpha-hydroxy-carboxylic acids are used as monomers.

5. Process according to one of claims 1 to 3, characterised in that trimethylene carbonate is used as a monomer.

6. Process for the preparation of resorbable polyesters according to one of claims 1 to 3, characterised in that monomers and prepolymers are used as starting materials in the process.

7. Surgical suture material comprising a resorbable polyester according to one of claims 2 to 6.

8. A galenic preparation comprising a resorbable polyester prepared according to one of claims 1 to 6.

9. The polyglycolide prepared according to claim I characterized in that it is soluble in hexafluoroisopropanol.

10. Surgical suture material comprising the polyglycolide as recited in claim 9.

11. A method of continuously preparing resorbable polyester which comprises employing a twin-screw extruder having temperature segments which can be adjusted independently so that the twin-screw extruder is used as a polymerization reactor.

* * * * *